United States Patent Office 3,169,101
Patented Feb. 9, 1965

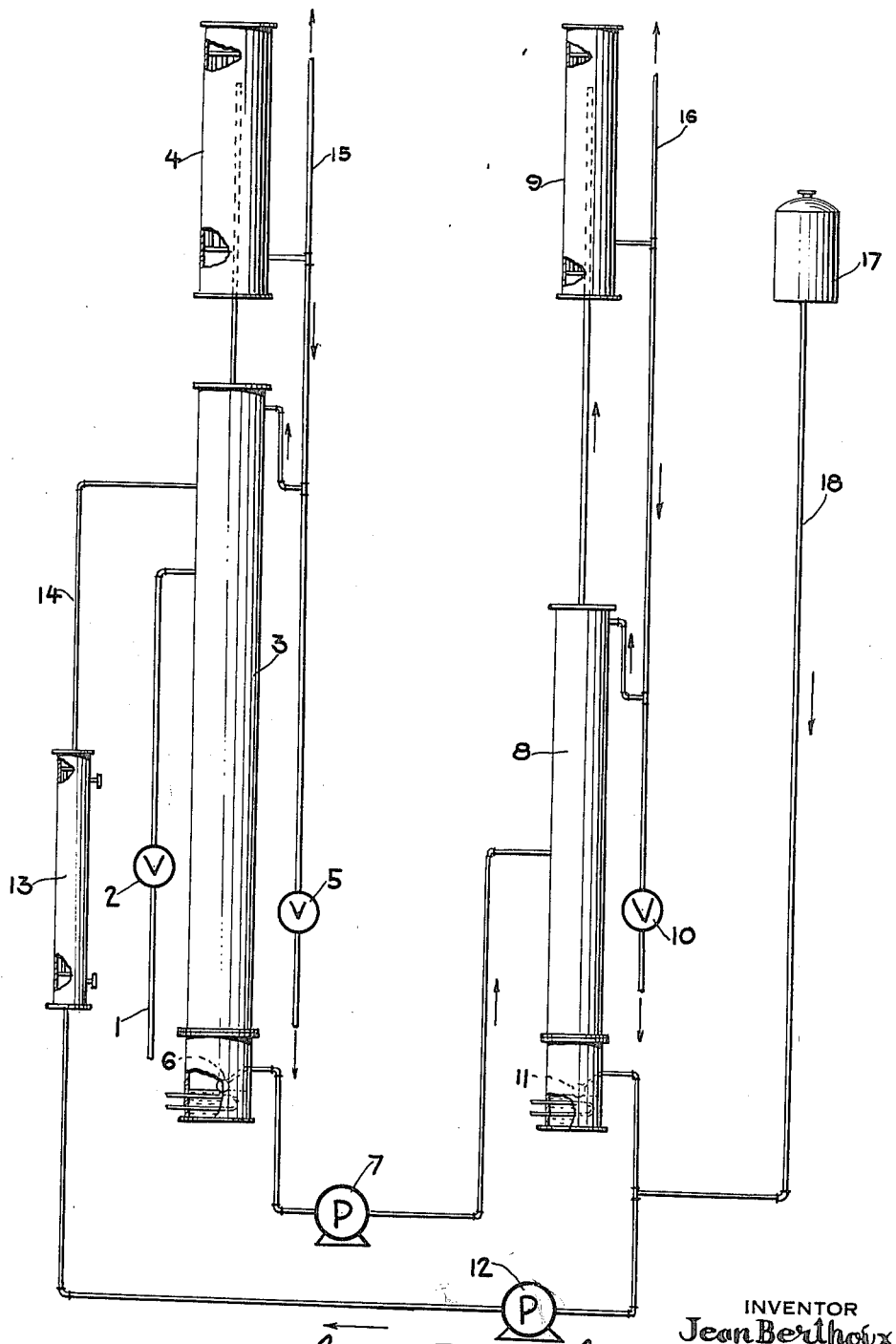

3,169,101
PURIFICATION OF IMPURE PHENOLS BY DISTILLATION WITH AN ORGANIC SOLVENT
Jean Berthoux, Lyon, Rhone, France, assignor to Progil Societe Anonyme, Lyon, France, a corporation of France
Filed May 28, 1962, Ser. No. 200,595
Claims priority, application France, Apr. 2, 1957, 37,273
7 Claims. (Cl. 202—39.5)

This invention relates to a process for the purification of phenol produced by the cleavage of cumene hydroperoxide and is a continuation-in-part of application Serial Number 725,747, filed on April 1, 1958, and now abandoned.

Phenol obtained by the cleavage of cumene hydroperoxide may be purified by conventional methods to satisfy very high standards of purity, such as that required by the United States Pharmacopoeia, but such phenol still contains trace impurities which cause the development of extremely troublesome coloured compounds when the phenol is subjected to chlorination eof sulphonation in the course of its use in chemical processes. Unless these trace impurities are removed substantially completely, phenol from this valuable synthetic source is useless for any purpose involving sulphonation or chlorination.

The principal impurities which lead to the formation of these strong colours on chlorination or sulphonation of the phenol containing them are alkyl substituted benzofurans, such as 2-methylbenzofurans, which are produced by the reaction of certain α-hydroxycarbonyl compounds with phenol. Such α-hydroxycarbonyl compounds include, for example acetyl methyl carbinol and hydroxyacetone. Neither the benzofurans nor their precursors are satisfactorily separated from phenol during normal distillation, but it is essential that they should be so separated if an acceptable product is to be obtained. The presence of 0.01% of 2-methylbenzofuran is objectionable, and phenol containing as much as 0.1% of this compound produces intensely dark colours on chlorination and unacceptable red colours on sulphonation.

The presence of small amounts of, for example, hydroxy acetone, acetoin or diacetyl is also objectionable, and the effect of these compounds may be seen from the following table. The optical densities were measured with light of the appropriate wavelength and in a 1 centimetre cell.

TABLE

| Constituent | Concentration, percent | Optical Density | |
|---|---|---|---|
| | | Sulphonation | Chlorination |
| 2-methylbenzofuran | 0.0005 | 0.115 | 0.50 |
| Do | 0.1 | 0.8 | 96.0 |
| Hydroxyacetone | 1.0 | | 13.8 |
| Do | 0.0006 | 1.06 | |
| Acetoin | 1.0 | | 56.0 |
| Do | 0.0005 | 1.26 | |
| Diacetyl | 1.0 | | 111.0 |
| Do | 0.0005 | 1.28 | |

The nature of the actual impurities present in any phenol obtained by the cleavage of cumene hydroperoxide will be dependent to some extent on the precise variation of process used. All impure phenols produced by this method, however, contain one or more precursors of alkyl substituted benzofurans, together with one or more of the alkyl substituted benzofurans themselves.

The removal of these impurities to produce the high degree of purity required has caused considerable difficulty, and it is an object of the present invention to provide a convenient and efficient process for such removal. Phenol produced by the cleavage of cumene hydroperoxide contains other impurities in addition to those referred to above, and it is a further object of the present invention to provide a process for the completion of the separation of pure phenol from these other impurities. Such impurities include, for example, cumene and other alkyl benzenes, α-methylstyrene and acetophenone; phenol supplied to the purification process of this invention may also contain acetone and other low boilers.

The invention is based upon the discovery that phenol containing, inter alia, the above mentioned impurities can be freed from them substantially completely by dissolving the impure phenol in an appropriate organic solvent boiling higher than phenol and subjecting the solution to distillation. Appropriate organic solvents contain one or more of the following functional groups: hydroxyl, ether-oxide and amine, and also contain unsubstituted methylene groups. Suitable solvents include polyalkylene glycols and their alkyl ethers and alkylene oxide derivatives of aliphatic diamines.

According to the present invention, therefore, the process for the removal from phenol, produced by the cleavage of cumene hydroperoxide, of impurities, including trace impurities the presence of which causes undesirable colour formation on chlorination and sulphonation of the phenol, comprises mixing the impure phenol with a solvent boiling higher than phenol as hereinafter defined, and distilling from the mixture the impurities contained therein substantially free of phenol, distilling the residual mixture to recover phenol substantially free of the said colour-forming impurities, and condensing the phenol vapours to recover purified phenol.

The process of this invention may be applied to phenol which has been fully purified by conventional methods, so that the impurities to be removed consist almost entirely of the colour-forming trace impurities, but it may be economically advantageous to apply the process to a phenol containing some or all of the other impurities referred to above in addition to the colour-forming impurities, some stages of the pre-purification being omitted. Notwithstanding the simultaneous presence of such impurities as cumene, hydroxyacetone, diacetyl and α-methyl-styrene on the one hand which have lower boiling points than phenol, and of 2-methylbenzofuran on the other hand which boils at a substantially higher temperature than phenol, the process of the present invention, surprisingly, removes these impurities substantially completely in one distillation step. Certain higher boiling impurities, if present, will remain in solution in the mixture of phenol and organic solvent, and these will be separated from the phenol during the subsequent distillation.

The organic solvent boiling higher than phenol used in the process of this invention may be a lower polyalkylene glycol, a lower mono-alkyl ether of a lower polyalkylene glycol, or a lower alkylene oxide derivative of an aliphatic diamine. In this specification, the term "polyalkylene glycol" refers to the type of compound in which two or more alkylene glycol residues are condensed together to form an ether linkage with the elimination of water, and excludes the so-called polymethylene glycols. The term "lower" as applied to polyalkylene glycols includes compounds in which the alkylene residues contain from 2 to 6 carbon atoms, and in which two or three alkylene residues are joined together by ether linkages. Suitable polyalkylene glycols include di- and tri-ethylene glycol and the corresponding polypropylene glycols, polybutylene glycols etc. The lower mono-alkyl ethers of these glycols may also be employed, the alkyl group containing from 2 to 6 carbon atoms. Typical of the third class of compounds, in which similar limitations on the number of carbon atoms apply is hydroxyethyl ethylenediamine.

The amount of added organic solvent should be sufficient to dissolve the crude phenol completely. Preferably the volume of added organic solvent at least equals the volume of liquid phenol at a temperature just above its melting point. The upper limit on the amount of added organic solvent is not critical, but very large volumes will unnecessarily increase the size of the plant and the cost of operating it without any corresponding advantage.

The process of this invention may be carried out in any suitable manner, either as a batch or continuous process. In a batch process, the impure phenol may be mixed with the organic solvent in the kettle, the impurities distilled therefrom, and the purified phenol recovered from the residue in the kettle by further distillation. It is, however, preferred to add the organic solvent during the course of the distillation at the top of the column. In a continous process, the impure phenol may similarly be mixed before feeding to a continuous still, the mixture of purified phenol and organic solvent may be withdrawn continuously from the base of the still, and purified phenol may be recovered therefrom in a further continuous still.

In a preferred method of carrying out the process of the present invention, the impure phenol and the organic solvent are fed to a continuously operating fractionating column, the point of introduction of the organic solvent being above the point of introduction of the impure phenol. Following this procedure, the distillation residue may be withdrawn and processed as described above. In any method of carrying out the invention, the organic solvent, after recovery of the dissolved phenol, may be recycled to the purification stage. When the process is operating under steady state conditions the recovery of phenol is substantially quantitative.

The process of this invention may be carried out at atmospheric pressure, although it is preferred to use reduced pressures. The actual pressures employed are not highly critical, but it is not normally necessary to employ a pressure lower than 30 millimetres of mercury, preferably 40 to 150 millimetres of mercury.

The process of the invention is illustrated diagrammatically in the accompanying drawing.

Impure phenol in the molten state, is introduced by line 1 via the flowmeter 2 into the fractional distillation column 3. The solvent boiling higher than phenol is introduced into column 3 by line 14 at a point above the point of introduction of the phenol. An overhead fraction containing lower-boiling impurities is condensed in condenser 4; part of this overhead fraction is removed by valve 5, and the remainder is returned to the top of the column 3 as liquid reflux.

A bottoms fraction containing phenol and solvent, but free from colour-forming and other impurities, is withdrawn from column 3 by the pump 7, the float system 6 maintaining a constant level in the base of the column.

The bottoms fraction is introduced into a second fractional distillation column 8, from which purified phenol is taken off overhead and condensed in the condenser 9. Part of this fraction is removed by valve 10, the remainder being returned to the top of column 8 as liquid reflux.

The solvent, which may still contain a certain proportion of phenol, is removed from the column 8 through the constant level device 11 by the pump 12, and is recycled to column 3 via the heat exchanger 13. Additional solvent may be introduced into the system by line 18 from the reservoir 17, to compensate for small losses in the overhead fraction from column 3. The consumption of solvent may be understood from the fact that, using ethylene glycol, the make-up required is approximately 0.5 to 1 kilogram per ton of purified phenol produced.

The two fractional distillations in columns 3 and 8 are preferably carried out under reduced pressure, applied by means of lines 15 and 16 respectively.

The process of the invention is further illustrated by the following examples. In the examples, optical density was determined using light of wavelength 5130 Angstrom units in a 1 centimetre cell.

*Example 1*

Impure phenol, obtained by the decomposition of cumene hydroperoxide, had the following analysis after removal of high boilers by distillation:

| | Percent by weight |
|---|---|
| Phenol | 76.5 |
| Cumene | 8.0 |
| α-Methylstyrene | 10.0 |
| Mesityl oxide | 4.0 |
| Other impurities (including colour-formers) | 1.5 |

This phenol was introduced into a distillation column corresponding to column 3 in the drawing at the rate of 1000 kilograms per hour. A mixture of 95 parts by weight of diethylene glycol and 5 parts by weight of phenol was introduced into the column at a point higher than the point of introduction of the phenol at the rate of 1500 kilograms per hour. Heat was supplied to the column at the rate of 120,000 kilocalories per hour. An overhead fraction containing impurities, including the colour-forming impurities, and 0.1% by weight of phenol was taken off at the rate of 235 kg./hour. A bottoms fraction was withdrawn from the base of the column containing per hour all of the phenol fed, less the very small amount lost in the overhead fraction, and all of the diethylene glycol fed less about one kilogram loss per hour, based on the hourly rate of feed.

The bottoms fraction was introduced into a second distillation column, corresponding to column 8 in the drawing, to which heat was supplied at the rate of 150,000 kilocalories per hour. An overhead fraction of purified phenol was taken off from this second column at a rate equal to the rate of feed of phenol to the purification, less the small loss in the overhead fraction from the first column. Both columns were operated under reduced pressure, such that the head temperature of each was 100° C.

For purposes of comparison with the phenol obtained by the process of this example a similar impure phenol was subjected to exhaustive fractional distillation by conventional methods, and a sample of each was chlorinated to the monochlorphenol stage.

The chlorinated phenol obtained from the conventionally purified phenol had an optical density of 20 units, while that obtained from phenol purified by the process of this invention had an optical density of 0.3 unit.

*Example 2*

An impure phenol obtained by the cleavage of cumene hydroperoxide had the following analysis after partial purification by conventional distillation:

| | Percent by weight |
|---|---|
| Acetone | 0.03 |
| Benzene | 0.06 |
| Ethyl benzene | 0.3 |
| Cumene | 2.1 |
| α-Methylstyrene | 7.4 |
| Butylbenzenes | Trace |
| Acetophenone | 0.15 |
| 2-methylbenzofuran | 0.10 |
| Hydroxyacetone | 0.15 |
| Phenol | 89.71 |

On chlorination of this phenol to the monochlorphenol stage, the product had an optical density of 36.6 units.

This impure phenol was fed to a column to which was separately fed a supply of diethylene glycol which contained a small proportion of phenol, in a manner similar to that used in Example 1. The proportions of impure phenol and diethylene glycol fed were such that the column contained approximately seven parts by weight of diethylene glycol for every three parts by weight of actual phenol. The column was operated at a pressure of 40 millimetres of mercury and the head temperature was 70° C. An overhead fraction was taken off which separated into two phases, the lower phase containing some diethylene glycol and 7.7% by weight of hydroxyacetone. The upper phase contained, inter alia, 0.55% by weight of hydroxyacetone, 19.5% by weight of cumene, 75.5% by weight of α-methylstyrene and tertiary butyl benzene, 0.6% by weight of 2-methyl benzofuran, and 0.51% by weight of phenol.

The bottoms products was withdrawn from the base of the column and distilled to recover purified phenol as in Example 1. Analysis of the purified phenol showed that it contained 0.01% by weight of cumene and 0.03% of α-methylstyrene; no hydroxy acetone was detected. On chlorination to the monochlorphenol stage it gave a product with an optical density of 0.9.

This example illustrates the high degree of purity which may be obtained by the process of this invention, both in respect of the lower boiling impurities and in respect of 2-methyl benzofuran, which boils higher than phenol.

*Example 3*

1000 parts by weight of diethylene glycol monobutyl ether was charged to a batch still fitted with an efficient fractional distillation column, and was raised to boiling point at a still pressure of 150 millimetres of mercury.

A mixture of 1000 parts by weight of diethylene glycol monobutyl ether and 1000 parts by weight of impure phenol, having the same composition as that used in Example 1, was fed at the top of the column at a rate of 600 parts by weight of the mixture per hour.

When column equilibrium had been established, an overhead fraction was taken off from the head of the column, the feed being contained. 246 parts by weight of distillate was obtained, consisting of hydrocarbons, impurities including the colour formers, and a little phenol. After the addition of all feedstock and completion of the distillation of the first runnings, 100 parts by weight of phenol was distilled over and recycled to the purification, following which pure phenol was obtained, amounting to 60% by weight of the impure material charged. The residue in the still contained 5% by weight of phenol. A sample of the pure phenol so obtained was chlorinated to the monochlorphenol stage and the product had an optical density of 0.2.

*Example 4*

The procedure of Example 2 was followed, except that all the impure phenol was introduced into the still, and the diethylene glycol monobutylether alone was fed at the top of the column at the rate of 2 kilograms per kilogram of phenol. A sample of the phenol so obtained was chlorinated to the monochlorophenol stage, and the product had an optical density of 0.2.

The examples quoted above are purely illustrative and it will be understood that modifications in the details of the invention will be readily apparent to those skilled in the art, and may be made without departing from the spirit of the invention or falling outside the scope of the invention as defined in the appended claims. In particular, similar results to those described above are obtained by the use of other polyalkylene glycols such as dipropylene glycol and dibutylene glycol, of other alkyl ethers of diethylene glycol and other polyalkylene glycols, and of hydroxyethyl ethylenediamine and such homologues as fall within the scope of the claims.

I claim:

1. The process for the removal from phenol produced by the cleavage of cumene hydroperoxide, of impurities, including trace impurities the presence of which causes undesirable colour formation on chlorination and sulphonation of the phenol, which comprises mixing the impure phenol with a solvent boiling higher than phenol and selected from the group consisting of lower poly- alkylene glycols, lower polyalkylene glycol monoalkyl ethers, and lower oxyalkylene derivatives of alkylenediamines all as hereinbefore defined, distilling from the mixture an overhead fraction containing impurities substantially free of phenol, distilling the residual mixture to recover phenol vapours substantially free of the said colour forming impurities, and condensing the phenol vapours to recover purified phenol.

2. The distillation process for purifying impure phenol produced by the cleavage of cumene hydroperoxide, and containing impurities including trace impurities the presence of which causes undesirable colour formation on chlorination and sulphonation of the phenol which comprises introducing the impure phenol into a first distillation column at an intermediate level, introducing an organic solvent for phenol boiling higher than phenol, and selected from the group consisting of lower polyalkylene glycols, lower polyalkylene glycol monoalkyl ethers and lower oxyalkylene derivatives of alkylenediamines all as hereinbefore defined, into the column at a point above the point of introduction of the impure phenol, maintaining the temperature in the column so that impurities substantially free of phenol are expelled from the column as an overhead fraction and purified phenol in solution in the organic solvent remains in the lower part of the column, withdrawing purified phenol and organic solvent from the base of the first distillation column and introducing it into a second distillation column, maintaining the temperature in the second column so that purified phenol substantially free of colour forming impurities is distilled from the second column as an overhead fraction, and recovering the distilled phenol as the product of the process.

3. The continuous process for removing from phenol, obtained by the cleavage of cumene hydroperoxide, impurities including trace impurities the presence of which causes undesirable colour formation on chlorination and sulphonation of the phenol, which comprises continually introducing the impure phenol into a first distillation column at an intermediate level, continually introducing an organic solvent for phenol having a boiling point higher than the boiling point of phenol and selected from the group consisting of lower polyalkylene glycols, lower polyalkylene glycol monoalkyl ethers, and lower oxyalkylene derivatives of alkylenediamine all as hereinbefore defined, into the first distillation column at a level above the point of introduction of the impure phenol, maintaining the temperature in the first column so that impurities substantially free from phenol are expelled from the column as an overhead fraction and purified phenol in solution in the organic solvent remains in the lower part of the column, continually withdrawing purified phenol and organic solvent from the base of the first distillation column and introducing it into a second distillation column, maintaining the temperature in the second distillation column so that purified phenol substantially free from colour-forming impurities is distilled from the second column as an overhead product, and the organic solvent remains in the lower part of the column, recovering the purified phenol as the product of the process, and continually withdrawing the organic solvent from the base of the second column and recycling it to the first distillation column.

4. The process for purifying impure phenol obtained by the cleavage of cumene hydroperoxide and containing impurities including trace impurities which cause undesirable colour formation upon chlorination and sulphonation of the phenol, which comprises the steps of mixing the crude phenol with at least one organic solvent selected from the group consisting of lower polyalkylene glycols, lower polyalkylene glycol monoalkyl ethers and lower oxyalkylene derivatives of alkylenediamines all as hereinbefore defined, heating the resulting mixture and taking off therefrom an overhead fraction distilling at a boiling point lower than phenol and containing impurities substantially free of phenol, heating the residual mixture under more severe conditions and taking off therefrom an overhead fraction consisting of purified phenol, and condensing the phenol vapours to recover purified phenol.

5. The process as claimed in claim 4 in which a further quantity of liquid organic solvent is introduced overhead during the course of the distillation.

6. The process as claimed in claim 4 in which the organic solvent is diethylene glycol.

7. The process as claimed in claim 4 in which the organic solvent is diethylene glycol monobutylether.

References Cited in the file of this patent

UNITED STATES PATENTS

| | | |
|---|---|---|
| 1,909,546 | Molinari | May 16, 1933 |
| 2,265,939 | Field | Dec. 9, 1941 |
| 2,782,242 | Clark | Feb. 19, 1957 |
| 2,790,834 | Morton | Apr. 30, 1957 |
| 2,834,820 | Bloch | May 13, 1958 |
| 2,862,853 | Luke | Dec. 2, 1958 |